United States Patent [19]

Blomgren

[11] Patent Number: 5,542,059
[45] Date of Patent: Jul. 30, 1996

[54] DUAL INSTRUCTION SET PROCESSOR HAVING A PIPELINE WITH A PIPESTAGE FUNCTIONAL UNIT THAT IS RELOCATABLE IN TIME AND SEQUENCE ORDER

[75] Inventor: James S. Blomgren, San Jose, Calif.

[73] Assignee: Exponential Technology, Inc., San Jose, Calif.

[21] Appl. No.: 361,017

[22] Filed: Dec. 21, 1994

Related U.S. Application Data

[63] Continuation of Ser. No. 180,023, Jan. 11, 1994.
[51] Int. Cl.$^6$ .................................................. G06F 9/30
[52] U.S. Cl. .................... 395/375; 395/728; 364/DIG. 1; 364/DIG. 2
[58] Field of Search ................................. 395/375, 725; 364/231.8, 232.23

[56] References Cited

U.S. PATENT DOCUMENTS

| | | | |
|---|---|---|---|
| 4,377,844 | 3/1983 | Kaufman | 395/425 |
| 4,538,241 | 8/1985 | Levin et al. | 395/400 |
| 4,633,417 | 12/1986 | Wilburn et al. | 364/550 |
| 4,763,242 | 8/1988 | Lee et al. | 395/500 |
| 4,780,819 | 10/1988 | Kashiwagi | 395/500 |
| 4,794,522 | 12/1988 | Simpson | 395/500 |
| 4,812,975 | 3/1989 | Adachi et al. | 395/500 |
| 4,821,187 | 4/1989 | Ueda et al. | 395/375 |
| 4,841,476 | 6/1989 | Mitchell et al. | 395/500 |
| 4,962,519 | 7/1990 | Nakayama | 395/775 |
| 4,972,317 | 11/1990 | Buonomo et al. | 395/375 |
| 4,991,081 | 2/1991 | Boshart | 395/425 |
| 4,992,934 | 2/1991 | Portanova et al. | 395/375 |
| 5,067,069 | 11/1991 | Fite et al. | 395/375 |
| 5,073,855 | 12/1991 | Staplin et al. | 395/375 |
| 5,077,654 | 12/1991 | Ohtsuki | 395/800 |
| 5,077,657 | 12/1991 | Cooper et al. | 395/500 |

(List continued on next page.)

OTHER PUBLICATIONS

Combining Both Micro–Code and Hardware Control in RISC, by Zheng, 1990 Mar. publication, pp. 11–15, Clemson University.
Combining RISC and CISC in PC systems Simon C. J. Garth, Nov. 1991, IEEE publication, pp. 10/1–10/5.
A 5.6–MIPS call–Handling Processor for switching systems, By Hayashi et al, Aug. 1989, IEEE publication, pp. 945–950.

*Primary Examiner*—Parshotam S. Lall
*Assistant Examiner*—Zarni Maung
*Attorney, Agent, or Firm*—Stuart T. Auvinen

[57] ABSTRACT

A CPU pipeline is able to process instructions from a complex instruction set computer CISC instruction set and from a reduced instruction set computer RISC set. A mode register is provided to indicate whether RISC or CISC instructions are currently being processed. Two instruction decode units are used, one for each instruction set. Compound CISC instructions flow from the decode pipestage to the address generate stage, then to an operand cache stage, and finally to an algebraic execute stage before the results are written back to the GPR register. When the CPU switches to RISC mode by clearing a mode bit in the mode register, the pipeline is re-arranged for processing the simpler RISC instructions. Two outputs are provided for the RISC instruction decoder. The first output is for simple execute-type instructions, while the second output is for load/store-type instructions, and connects to the address generate pipestage, which generates an address for the operand cache stage. These instructions are prevented from continuing to the execute stage by a mux. The mux normally connects the operand cache stage to the execute stage when CISC instructions are being processed, but the mux directly connects the second output of the RISC instruction decoder to the execute stage when the mode register enables RISC instruction decoding. This reduces the latency for RISC instructions by 1 or 2 clocks. An alternate embodiment re-arranges the pipeline dynamically as simple instructions are detected by the decode units. The preferred embodiment uses a fixed pipeline with the execute hardware relocatable to the D, C, or M pipestages. Thus the pipeline is optimized for both RISC and CISC instructions.

16 Claims, 6 Drawing Sheets

U.S. PATENT DOCUMENTS

| | | | |
|---|---|---|---|
| 5,097,407 | 3/1992 | Hino et al. | 395/375 |
| 5,136,696 | 8/1992 | Beckwith et al. | 395/375 |
| 5,150,468 | 9/1992 | Staplin et al. | 395/375 |
| 5,167,023 | 11/1992 | de Nicolas et al. | 395/375 |
| 5,210,832 | 3/1993 | Maier et al. | 395/375 |
| 5,222,223 | 6/1993 | Webb, Jr. et al. | 395/425 |
| 5,226,164 | 7/1993 | Nadas et al. | 395/800 |
| 5,230,045 | 7/1993 | Sindhu | 395/425 |
| 5,230,069 | 7/1993 | Brelsford et al. | 395/400 |
| 5,241,636 | 8/1993 | Kohn | 395/375 |
| 5,255,384 | 10/1993 | Sachs et al. | 395/425 |
| 5,269,007 | 12/1993 | Hanawa et al. | 395/375 |
| 5,287,465 | 2/1994 | Kurosawa et al. | 395/375 |
| 5,291,586 | 3/1994 | Jen et al. | 395/500 |

DUAL INSTRUCTION SET PROCESSOR HAVING A PIPELINE WITH A PIPESTAGE FUNCTIONAL UNIT THAT IS RELOCATABLE IN TIME AND SEQUENCE ORDER

RELATED APPLICATION

This application is a continuation of Ser. No. 08/180,023 filed 1/11/94, now abandoned.

BACKGROUND OF THE INVENTION

1. Field of the Invention

This invention relates to microprocessor architectures, and more particularly to a pipeline with variable latencies to support execution of multiple instruction sets.

RELATED APPLICATION

This application is related to a co-pending application for a "Dual-Instruction-Set Architecture CPU with Hidden Software Emulation Mode", invented by Blomgren and Richter, Ser. No. 08/179,926, filed 1/11/94, and assigned to the same assignee as this application.

2. Description of the Related Art

The performance of microprocessors has been increased through the use of the well-known technique of pipelining. A pipelined central processing unit or CPU is divided into several units referred to as stages or pipestages, each pipestage typically requiring one processor clock period to perform its function. As an instruction is processed by the microprocessor, it flows through the pipeline: first the instruction is fetched from memory by the Fetch pipestage, then the instruction is decoded by the D stage, the decoded instruction may then be executed by an arithmetic-logic-unit (ALU) or adder, then the result from the execute stage is written to a register file or to memory. While a first instruction is in the execute stage, the following instruction is in the D stage, and the next following instruction in the Fetch stage. Thus many instructions are being processed at the same time, but each instruction is processed over several clock periods. The result is that the clock period may be reduced, improving performance.

Pipelining has worked very well with simple, well-organized instruction sets such as with reduced instruction set computers or RISC instruction sets. However, older, more complex instructions set computers or CISC instruction sets contain instructions that require additional use of functional units. Some complex, compound instructions actually perform the equivalent work of two or more simple instructions. A high-performance design may require adding more functional units and stages to the pipeline than are necessary for the simpler instructions. The difficulty arises in trying to process both simple and complex instructions in the same pipeline. If the pipeline is to execute both a simple RISC and a complex CISC instruction set, the difficulty is intensified.

When instructions are pipelined, the results from one instruction may be needed by a subsequent instruction, even before the instruction completes. Techniques such as bypassing and forwarding of results can route the result from one instruction to a subsequent instruction, when both instructions are in different pipestages of the pipeline. However, the subsequent instruction will still have to wait for the next pipestage to be released by the previous instruction.

All microprocessors perform 3 basic types of instructions: accessing memory, performing algebraic operations, and control transfer. These 3 types can be referred to as LOAD/STORE, ALU, and BRANCH operations. Regardless of the architecture or instruction set, all instructions are composed of these 3 component operations. An example is in the x86 instruction set, made popular by personal computers (PC's) using Intel Corporation (of Santa Clara, Calif.) 386 and 486 microprocessors. The x86 POP instruction performs a LOAD from a stack in memory followed by an ALU operation to increment the stack pointer register. Compound instructions are common in CISC instruction sets such as the x86 set, but are rare in RISC instruction sets.

OPERATIONAL LATENCIES

ALU operations include addition, subtraction, Boolean operations, and bit shifts. Multiplication, division, and other complex floating-point operations may also be performed if sufficient hardware resources are provided. This type of instruction usually takes one or two operands from a high-speed internal CPU general-purpose register file (GPR), and stores the result back to this register file. Since data is not transferred off the CPU die, the operation is very fast, typically requiring one clock period. The latency, or time required to perform the operation defined by the instruction, is one clock period. Latency does not include fetch, decode, or write-back time normally required for instruction processing; latency here refers to the time to perform a component operation.

LOAD/STORE operations must first compute a memory address where the data resides, and then write data to that memory location or read data from that location or address. Data is transferred between a register in the GPR and the memory, which can be slow DRAM-based system memory or cache memory. The cache may be on the CPU die or off-chip. With a cache, the transfer will usually take one clock, while the address computation, which normally requires addition, takes an additional clock. Thus the LOAD/STORE operations require a total of 2 clocks, for a latency of two.

Control transfer or BRANCH operations calculate a new address to load into the instruction pointer. If the branch is conditional, a new target address for the code to jump to is calculated, and a branch condition is evaluated, usually from the condition code register associated with the ALU. Branch operations may be quite complex to pipeline, but optimizations and prediction techniques are possible. A supplementary adder may be provided to calculate the target address early, during the decode pipestage, and the Fetch stage may be designed to fetch both the target instruction and the sequential (branch not taken) instruction. However, since the branch may have to wait for the condition codes to be set by a previous instruction's ALU pipestage, and the next instruction must be decoded after the branch decision is made, the latency is at least two clocks.

LATENCY DIAGRAM

Figure 1:
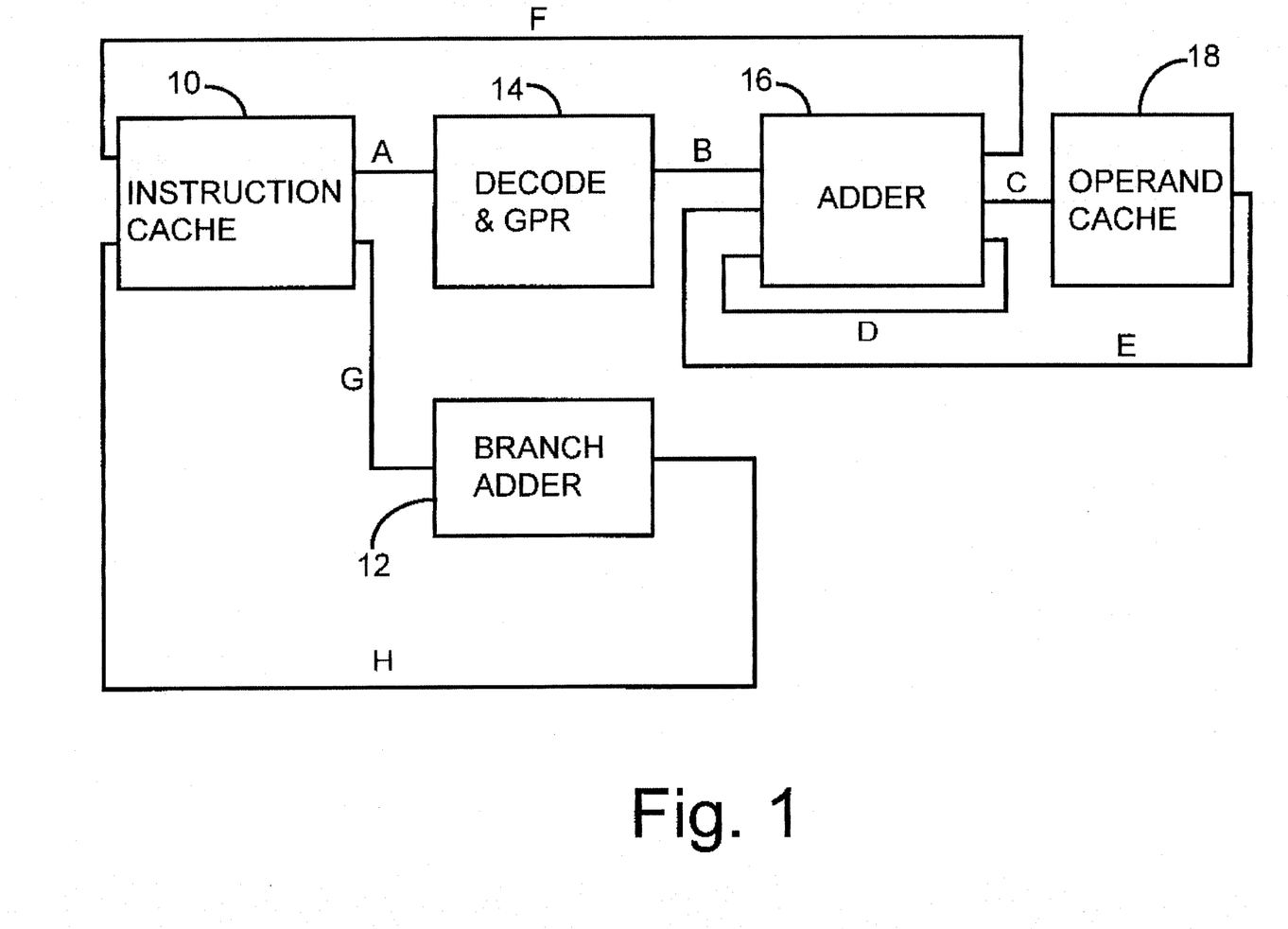
FIG. 1 is latency diagram of a simple RISC pipeline.

FIG. 1 is a latency diagram that is useful in designing pipelines. Each box in the figure represents an operation or function that requires one clock to complete. Connections between boxes show how one operation may depend upon the results of another operation. The computational work performed by any instruction can be analyzed with this latency diagram. Instruction cache 10 contains a buffer of instructions that have not yet been decoded, and may contain instructions that will not be executed if a branch occurs. Branch adder 12 is used to calculate the target address for a branch. Instruction decode and register file 14 decodes an instruction fetched into the instruction cache, and provides the register operands to adder 16, which performs an ALU operation, or can calculate an address. Operand cache 18 is a cache of main memory data or operands and can be written into for a STORE operation or read from in a LOAD operation.

If an operation has a greater latency than 1 clock, then the diagram may be modified accordingly. For example, if the operand cache 18 were slow and required 2 clocks, then box 18 could be replaced with two boxes in sequence. Similarly, the adder could be replaced with two or three boxes for floating-point operations. Connections may also be modified depending upon the design; for example, a very high-speed design might not allow connection "D", the bypass around the ALU. Another design might have adder 16 located after operand cache 18 rather than before it, or in both locations.

A LOAD/STORE will flow through the latency diagram, FIG. 1, starting as an instruction in the I-cache 10, decoded in block 14, which provides address components from the register file or immediate values from the instruction itself, and ALU control information, along path "B" to adder 16. Adder 16 generates a memory address from these address components and provides this address along path "C" to the operand cache 18. The operand cache stores or loads the data specified by the address. If the operation is a load, then the data read from the cache is available to the adder 16 along path "E", and is loaded into the register file (not shown). Thus the load operation takes 4 clocks to execute and provide its data result. Four clocks are required because of dependencies within the load instruction itself: the operand cache could not be accessed before the address was generated, and the address could not be generated before the register file provided the components.

An operand dependency may exist with the instruction following the load. If the subsequent instruction is an Add using the data loaded by the load instruction, then the Add instruction will be in the adder block 16 while the load instruction is in the operand cache 18. However, the adder cannot perform the add until the end of the clock period when the data is provided from the cache 18 to the adder 16 along path "E". Thus the add instruction must wait or "stall" in the add stage 16 for an additional clock before starting the add operation. The stall would still be necessary even if several adder blocks 16 were provided, because the data was not yet available to the add instruction.

Recently, compilers have been designed to re-order instructions to try to reduce dependencies that cause stalls. In the above example, if the Add instruction could occur after another instruction, rather than immediately following the load instruction, then the stall would be avoided. RISC compilers in particular have been successful at instruction re-ordering, allowing for CPU's with multiple functional units to increase performance using dual-pipeline techniques such as super-scalar designs. However, CISC instructions may perform both the load and the add as one atomic instruction, eliminating the possibility of re-ordering. Thus the CISC instruction set itself imposes latencies.

RISC PIPELINE

RISC instructions are typically simple instructions that do not perform both an ALU operation and a cache or memory operand access. Thus path "E" of FIG. 1 is not used within a single instruction, but may be used by a second instruction following a load instruction. However, re-ordering compilers reduce or eliminate the need for path "E". Thus a simple pipeline for RISC is:

DECODE  ADDER  OPERAND CACHE

A write-back stage is normally also included at the end of the pipeline when the results are written back into the register file and the condition codes are modified. However, this stage does not affect the dependencies and is thus not shown. Likewise the fetch stage is not shown. The adder is designed for both ALU operations and address generation, since address generation is usually simple in RISC instructions. An instruction that uses the ALU will store its result back to the register file rather than the operand cache memory, while an instruction accessing the operand cache will not use the ALU except for generating the address in the operand cache. The Execute pipestage for RISC instructions can perform an address generation or an ALU operation, but not both at the same time.

The diagram below indicates the progression of each instruction through the RISC pipeline, with time increasing to the right by one clock for every stage, while subsequent instructions are listed below one another. Stages are abbreviated as D, E, C, and W, for decode, execute, cache, and write-back.

| Time (clocks):   | 1 | 2 | 3 | 4 | 5 | 6 |
|---|---|---|---|---|---|---|
| 1st Instruction: | D | E | C | W |   |   |
| 2nd Instruction: |   | D | E | C | W |   |
| 3rd Instruction: |   |   | D | E | C | W |

CISC PIPELINE

Because of the existence of compound CISC instructions that can both load an operand and execute an ALU operation, a stall of two clocks would result if the RISC pipeline were used for certain compound CISC instructions. The stall occurs because the adder must be used twice by the compound instructions—first for address generation, then after the operand cache fetch during the execute/ALU phase. Any subsequent instruction needing the adder for address generation must wait until the adder is free.

| 1st Instruction: | D | E | C | E | W |   |   |
|---|---|---|---|---|---|---|---|
| 2nd Instruction: |   | D | D | D | E | C | E | W |
|   |   |   | \| | \| |   |   |   |
|   |   |   | Stall | Stall |   |   |   |

A better pipeline for compound CISC instructions results from breaking the adder into two separate pipestages. The first adder is used solely for address generation, and is abbreviated "A", while the second adder is used for algebraic ALU execute operations, and is designated "X". This is often necessary for CISC instructions sets because address generation can be much more complicated than for RISC instructions. CISC address generation may require a 3-component add, whereas the execute unit only adds two operands, but must perform shifts and condition code operations. Thus the two types of operations may be justifiably separated for CISC pipelines. With two separate adders, the instruction flow does not have any stalls:

```
1st Instruction:  D  A  C  X  W
2nd Instruction:     D  A  C  X  W
```

Thus the better CISC pipeline is:

DECODE  ADDR GEN  OPERAND CACHE  EXECUTE

Figure 2:
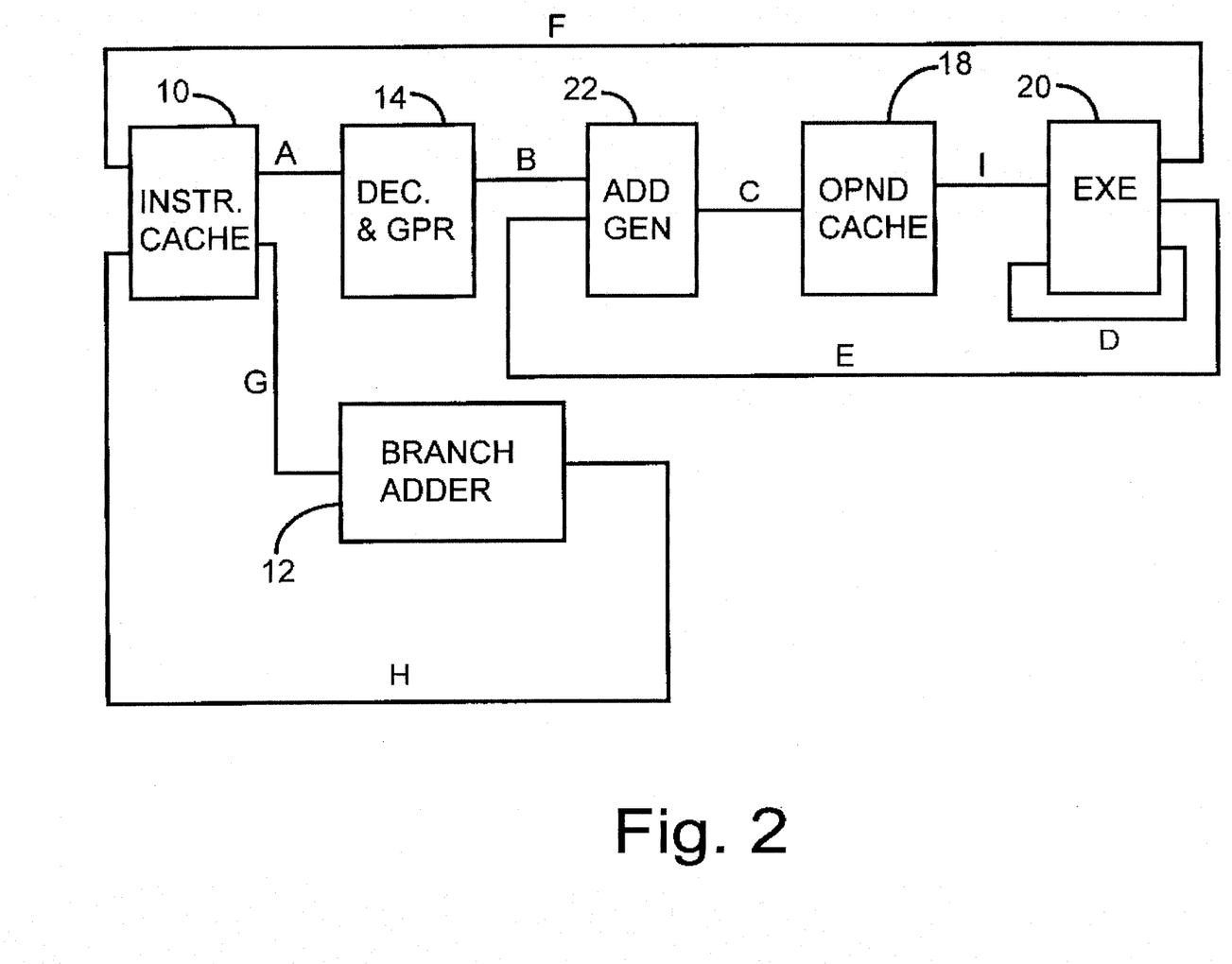
FIG. 2 is a latency diagram for a complex CISC pipeline.

A disadvantage of this pipeline can be seen in reference to FIG. 2. FIG. 2 shows the same latency diagram as FIG. 1, with the addition of block 20, the execute stage, which occurs after the operand cache 18. The Adder block 16 of FIG. 1 has been changed to Address Generate Block 22 to highlight its restricted function in the CISC pipeline. If execute does not occur until after the operand cache 18, then path "F" is delayed for 2 additional clocks. This can be a disadvantage when the branch prediction logic mis-predicts and path "F" is then needed. Condition codes from the previous operation are delayed 2 clocks relative to the decode of the branch instruction, because they are not available until the previous operation finishes the execute stage, which is now separated from the decode stage by 2 additional stages—the address generate adder and the operand cache.

DUAL-INSTRUCTION-SET PIPELINE

Pipeline optimization is more difficult when instructions from 2 different instruction sets must be executed with the same CPU. It would be possible to build 2 separate pipelines, one for RISC and another for CISC, but the cost of having 2 of every functional unit is prohibitive. In addition, the complexity is great, especially if results must be exchanged between the two pipelines. However, simply choosing a RISC or a CISC pipeline and processing both instruction sets has severe performance penalties. For example, if a CISC instruction is executed on a simple RISC pipeline, a 2-clock stall can result for many sequences of instructions, such as explained above for a load followed by an add. However, if a RISC instruction is executed on a CISC pipeline, results are delayed by two clocks because of the 2 additional stages—address generate and operand cache—inserted before the execute stage. The diagram below shows an Add followed by a load that requires the result of the add, "y", in order to calculate the address. This sequence is on the RISC pipeline.

```
Time (clocks):  1  2  3  4
Add y           D  E  C
Load y             D  E  C
```

No stalls occur because the result "y" from the execute stage is available at the end of time 2 for use in address generation by the Execute stage at time 3. However, stalls result when running this same sequence of RISC instructions on a CISC pipeline, as shown below.

```
Time (clocks):  1  2  3  4  5  6  7
Add y           D  A  C  X
Load y             D  A  A  A  C  X
                         |  |
                       Stall Stall
```

A two-clock stall occurs because the result of the add instruction is not available until late in the pipeline, in the execute/ALU "X" stage at the end of time 4. This stall did not occur when the execute stage was located earlier in the pipeline, as in the RISC pipeline arrangement.

Thus, the example shows a 2-clock penalty for a sequence of RISC instructions when run on a CISC pipeline, while the earlier example showed a 2-clock penalty when CISC instructions are run on a RISC pipeline. A dual-instruction-set CPU would thus have to be optimized either for RISC or for CISC instructions, with a significant penalty when executing instructions from the non-optimized instruction set. What is desired is a pipeline that can execute both RISC and CISC instructions without a penalty caused by optimizing the pipeline for one instruction set or the other.

SUMMARY OF THE INVENTION

A CPU has a pipeline for processing instructions from 2 separate instruction sets. The CPU contains a plurality of functional units for processing the instructions, with at least one of the functional units being temporally re-locatable. This has the advantage that the pipeline may be optimized for both instruction sets.

In another aspect of the invention, functional units are relocated when instructions from a first instruction set are being processed. In particular, the execution functional unit is relocated either when instructions from the first instruction set are being processed, or when simple execute-only instructions are detected. Thus the pipeline is re-arranged when processing simple execute-only instructions rather than complex compound instructions which require a more complex pipeline.

DETAILED DESCRIPTION

More detail on the dual-instruction set architecture may be found in related co-pending application for a "Dual-Instruction-Set Architecture CPU with Hidden Software Emulation Mode", invented by Blomgren and Richter, pending application Ser. No. 08/179,926, filed 1/11/94, and assigned to the same assignee as this application, hereby incorporated by reference.

This improvement relates to a central processing unit (CPU) with a dual-instruction set architecture. While the detailed description describes the invention in the context of a reduced instruction set computer (RISC) and a complex instruction set computer (CISC), it is contemplated that the invention applies to other instruction sets besides RISC and CISC, and to more than two instruction sets, without departing from the spirit of the invention.

The basic CISC pipeline is modified for processing simple RISC instructions without the penalties associated with processing RISC instructions on the standard CISC pipeline.

The sequence in which the functional units appear as instructions are being processed must change to accommodate the simpler RISC instructions. The basic CISC pipeline:

DECODE   ADDR GEN   CACHE   EXECUTE must be modified to look like a RISC pipeline when executing RISC instructions:

DECODE   ADDR GEN/EXE   CACHE

For the load/store type of instructions the pipeline should skip the last pipestage, the algebraic execute stage, and move directly to the write-back stage if needed. For the RISC execute instruction, the execution facility must be moved up 2 clocks in time to appear immediately after the decode stage. The cache stage is not needed for RISC execute instructions since they always write their results to the local register file, never to the cache memory. Therefore, execute instructions proceed to the write-back stage after the execute unit.

Figure 3:
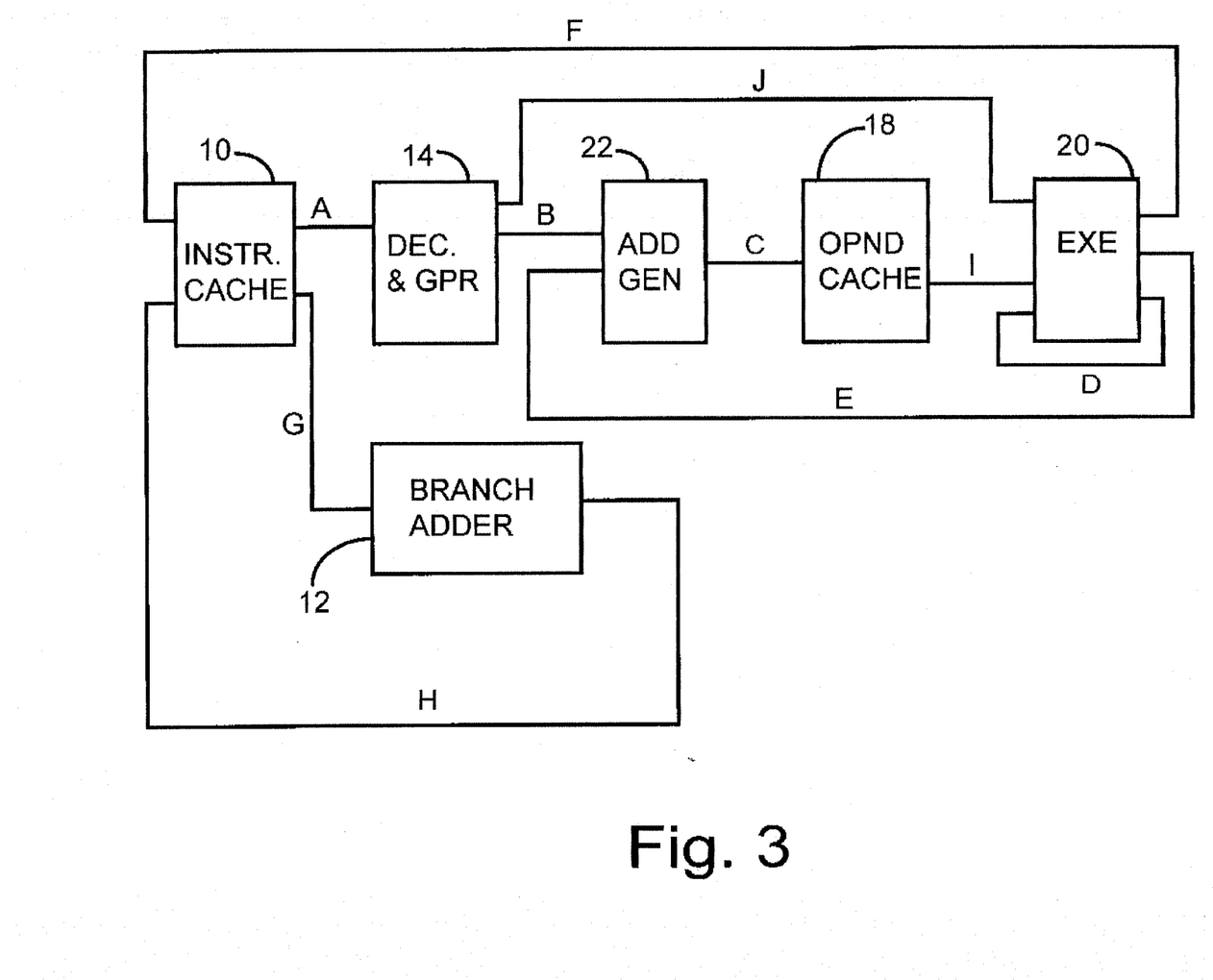
FIG. 3 is a latency diagram for a temporally-reconfigurable pipeline.

FIG. 3 is a latency diagram for a temporally-reconfigurable pipeline. An additional path "J" has been added to the prior-art latency diagram of FIG. 2. This path "J" connects the execute unit 20 directly to the instruction decode unit 14. Instructions may flow out of decode unit 14 along two different paths, either the normal CISC path to the address generate unit 22, along path "B", or directly to execute unit 20 via path "J". Consequently it is possible for an instruction to follow the full CISC pipeline from decode 14 to address generate 22, operand cache 18, to execute 20, but it is also possible to skip the address generate and operand cache stages.

Additionally, a pipe flow may terminate before reaching the final write-back pipestage. This is desirable for store operations. RISC load/store operations also do not need the execute pipestage, and therefore this stage is also skipped when these types of instructions are detected. Additional ports to the GPR register file may be needed because more than one instruction can terminate and desire to write its results to the register file. Condition codes may be updated by more than a single instruction during any given cycle, but the codes from the earlier instruction are over-written by the condition codes from the later instruction.

In the simplified embodiment, the instruction decode logic determines the type of instruction and which pipestages are needed by the instruction. A simple RISC execute instruction will be detected by the decode logic and the decoded instruction will be sent directly to the execute unit along path J. However, if another instruction is in pipestages A or C, and will require the execute stage, then the execute instruction must stall in the decode pipestage until the previous instruction has released the execute pipestage. Thus the execute stage may be reserved by an instruction in the address generate or cache stages, preventing the execute instruction from proceeding. Although it would be possible to send the execute instruction to the execute stage without the stall, out-of-order instruction execution is undesirable because of the added complexity.

```
CISC read-execute   D   A   C   E
Add                 D   D   D   E
                        |   |
                        Stall Stall
```

However, when a series of RISC execute instructions occur in sequence, the instruction decode logic will send these along path "J" directly to the execute unit without stalls, as the diagram below shows.

```
Add   D   E
Add       D   E
Add           D   E
```

RISC loads and stores may be mixed together with simple execute instructions, allowing the executes to skip around the load/stores, because the load and stores do not need to reserve the execute stage:

```
Add    D   E
Load       D   A   C
Add            D   E
Add                D   E
Load                   D   A   C
```

If the data operand loaded by the first Load instruction is needed by a later execute instruction, then a data interlock will occur, causing a stall in the execute stage for the Add operation. This is a well-known technique in pipelined CPU's.

```
Add     D   E
Load y      D   A   C
Add y           D   D   E
Add                     D   E
Load                        D   A   C
                        |
                        Data Interlock Stall
```

Because of the prevalence of optimizing compilers for RISC that can re-order instructions, data interlocks such as shown above are rare. If the standard CISC pipeline is used, one additional clock is required to execute this sequence and produce the result without the data interlock. This is because of the additional 2 clock latency in the pipeline between the decode and the execute unit.

```
Add     D   A   C   E
Load y      D   A   C
Add y           D   A   C   E
Add                 D   A   C   E
Load                    D   A   C   E
```

Figure 4:
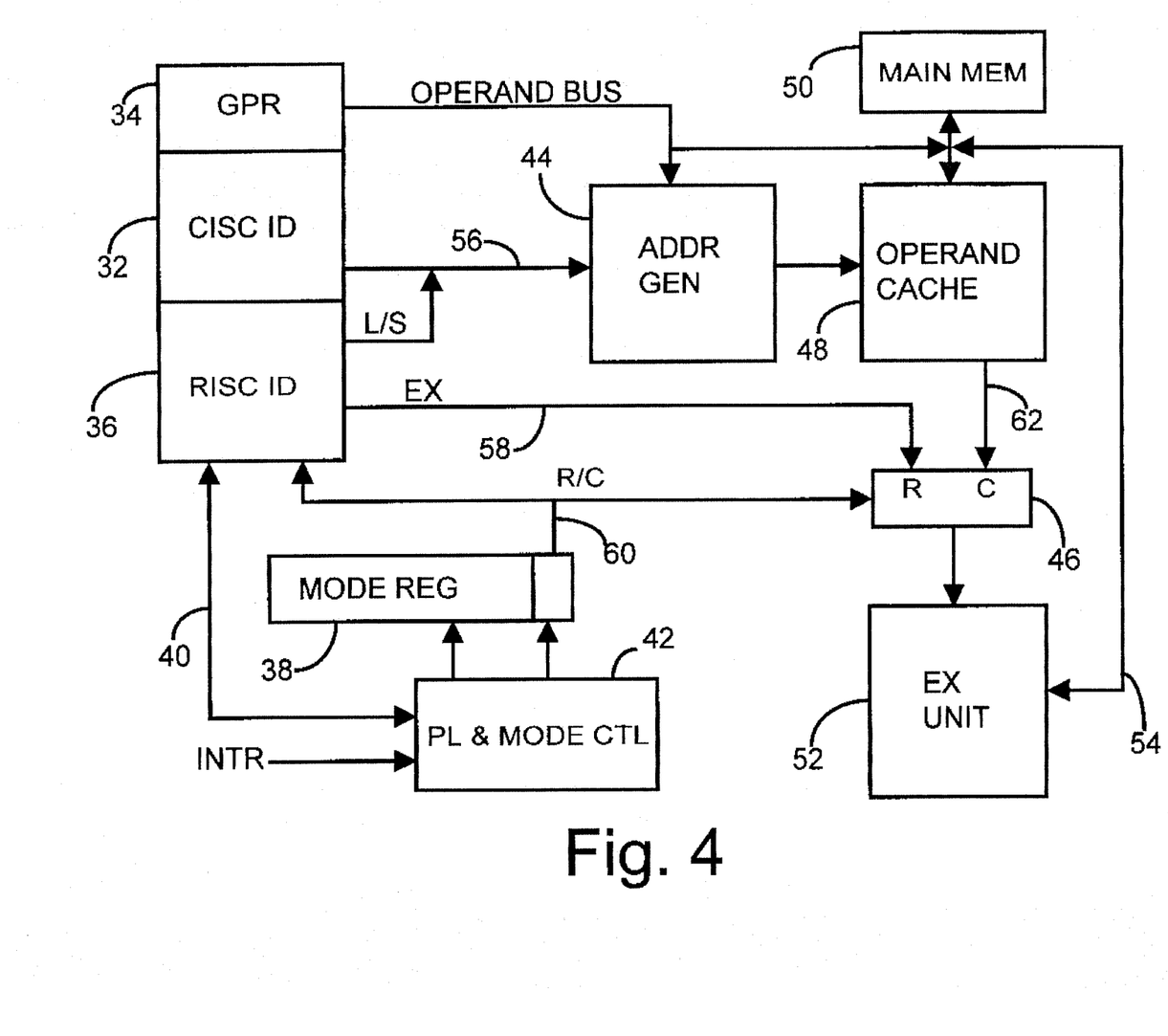
FIG. 4 is a block diagram of the temporally-reconfigurable CPU.

FIG. 4 is a block diagram of the simplified embodiment. An instruction fetcher (not shown) supplies an instruction to be decoded by instruction decode unit 32, 36. Since the pipeline supports both a RISC and a CISC instruction set, and these instruction sets are separate and independent in the encoding of opcodes to instructions, two separate instruction decode units are provided. Thus there is no restriction placed on the two instruction formats in relation to one another. Different bit fields of the instruction word may contain the opcode, while other bit fields may contain operand register pointers or identifiers or immediate data. In fact, the size of the instruction word may be different for the two instruction sets. The two instruction decoders will break the instruction word up into different bit fields as required by the respective instruction set. Since the same opcode number may map or encode different operations in the two instruction sets, one instruction decode must be disabled and the other enabled, depending upon the instruction set being processed at that time.

The RISC and CISC instruction sets have independent encoding of instructions to opcodes. While both sets have ADD operations, the opcode number which encodes the ADD operation is different for the two instruction sets. In fact, the size and location of the opcode field in the instruction word is also different for the two instruction sets.

Mode register 38 contains a bit to indicate the current mode or instruction set being processed. This RISC/CISC mode bit is supplied to the instruction decoders 32, 36 along signal 60. This signal will enable RISC decoder 36 and disable CISC decoder 32 if set to one, otherwise it will enable CISC decoder 32 and disable RISC decoder 36 if logically zero or cleared.

If CISC mode is enabled, decoded instructions will flow through the pipeline as arranged for compound CISC instructions. Pipestages address generate 44, operand cache 48, and execute unit 52 will be sequenced through for each instruction. Pipeline stalls and repeated compound instructions may cause some stages to be repeated several times. The decoded instruction from CISC decode unit 32 is sent along bus 56 to the address generate unit 44, which may receive operands from the general-purpose register (GPR) file 34. Address generate unit 44 calculates the operand address and supplies this to the operand cache 48. The operand from the cache is sent along bus 62 to the execute unit 52, which calculates the final result, which is written back to the GPR 34 along the operand bus 54. Operand bus 54 may have to be several operand words in width to supply sufficient bandwidth for the various pipeline functional units.

Slower main memory 50 provides operands when the operand cache 48 does not contain the requested operand, and provides a back-up store for operands written to the cache 48. Multiplexer or mux 46 selects the operand from the operand cache 48 when CISC mode is indicated by RISC/CISC mode bit 60 from mode register 38. Thus a connection is made between the operand cache 48 and the execute unit 52 for CISC instructions, resulting in the full CISC pipeline of D - A - C - E.

When mode register 38 indicates RISC mode, signal 60 sets mux 46 to connect the output of the RISC instruction decode unit 36 directly to the execute unit 52. Operands from the cache are prevented by mux 46 from being sent to execute unit 52 over bus 62. Thus load/store operations must terminate before the execute stage by writing the operand back to the GPR 34 using operand bus 54. Since RISC load/store instructions do not support an execute operation combined with the load/store, path 62 is not needed. The re-configured pipeline for RISC load/stores is therefore: D - A - C.

Two outputs are provided from the RISC instruction decode unit 36: one output for load/store operations and the second output for execute operations. The third type of operation, branches, require special hardware such as a dedicated adder and are thus not shown in FIG. 4. Decoded load/store-type instructions connect to the address generate unit 44 over bus 56 while execute-type instructions are decoded and sent over path 58 to execute unit 52 through mux 46. RISC execute instructions thus flow through a different portion of the pipeline than load/stores; the execute pipeline is D - E, while the load/store pipeline is D - A - C.

The output from the CISC decode unit 32 and the load/store output from RISC decode unit 36 can be safely combined on bus 56 because only one of the 2 decode units will be enabled at any one time. Bus contention will not occur with only one of the decode units driving bus 56 to the address generate unit 44.

Switching between RISC and CISC modes is under the control of pipeline and mode control logic 42. Mode logic 42 sets or clears the RISC/CISC bit 60 in mode register 38 to reconfigure the pipeline using mux 46. In addition, mode bit 60 enables one of the two instruction decoders. In a preferred embodiment, certain very complex CISC instructions are not directly supported in hardware but are emulated by software routines composed of simpler RISC instructions.

CISC instruction decode unit 32 will detect these emulated instructions and signal an unknown opcode over line 40 to mode control 42. Mode control 42 will then set the RISC bit 60 in register 38 and load the instruction pointer (not shown) with the address of the emulation routine in memory. The RISC emulation routine will execute, and perform the operation that the very complex CISC instruction would have performed. The last instruction of the emulation routine will be a special extended RISC instruction causing the mode register 38 to be reset to CISC mode and the instruction pointer updated to point to the following CISC instruction. The CISC program will continue with the following instruction unaware that the instruction was emulated with RISC instructions.

Switching from CISC mode to RISC mode may also occur when an interrupt or exception is signaled to the mode logic 42. Events such as divide-by-zero and adder overflows may cause the mode switch to occur. If paging is provided with a translation-lookaside buffer (TLB) on the CPU die, then TLB misses or page faults can also cause the mode switch, allowing the TLB to be loaded only by the RISC mode.

Thus both CISC and RISC instructions will be processed during execution of the same program, and the need exists for the pipeline to efficiently execute both RISC and CISC instructions. Rapid re-configuration of the pipeline between a pipeline optimized for RISC instructions and one optimized for CISC instructions is possible with the mux 46 and mode register 38.

DYNAMIC PIPELINE RECONFIGURATION

In the simplified embodiment, the pipeline is static or fixed depending upon the instruction set currently being decoded. A mode register is provided to indicate whether RISC or CISC instructions are being decoded and executed. The mode register enables path "J" of latency diagram FIG. 3 when RISC mode is indicated, and the instruction decode unit sends execute instructions directly to the execute unit while load/store operations are sent to the address generate unit. However, if the mode register indicates that the CISC instruction set is being decoded, then path "J" is disabled and all instructions are sent to the address generate unit first. The simplified embodiment has the advantage of a simpler decode unit, with fewer critical timing paths, since the pipeline is only statically re-configured, rather than dynamically on an instruction-by-instruction basis.

Figure 5:
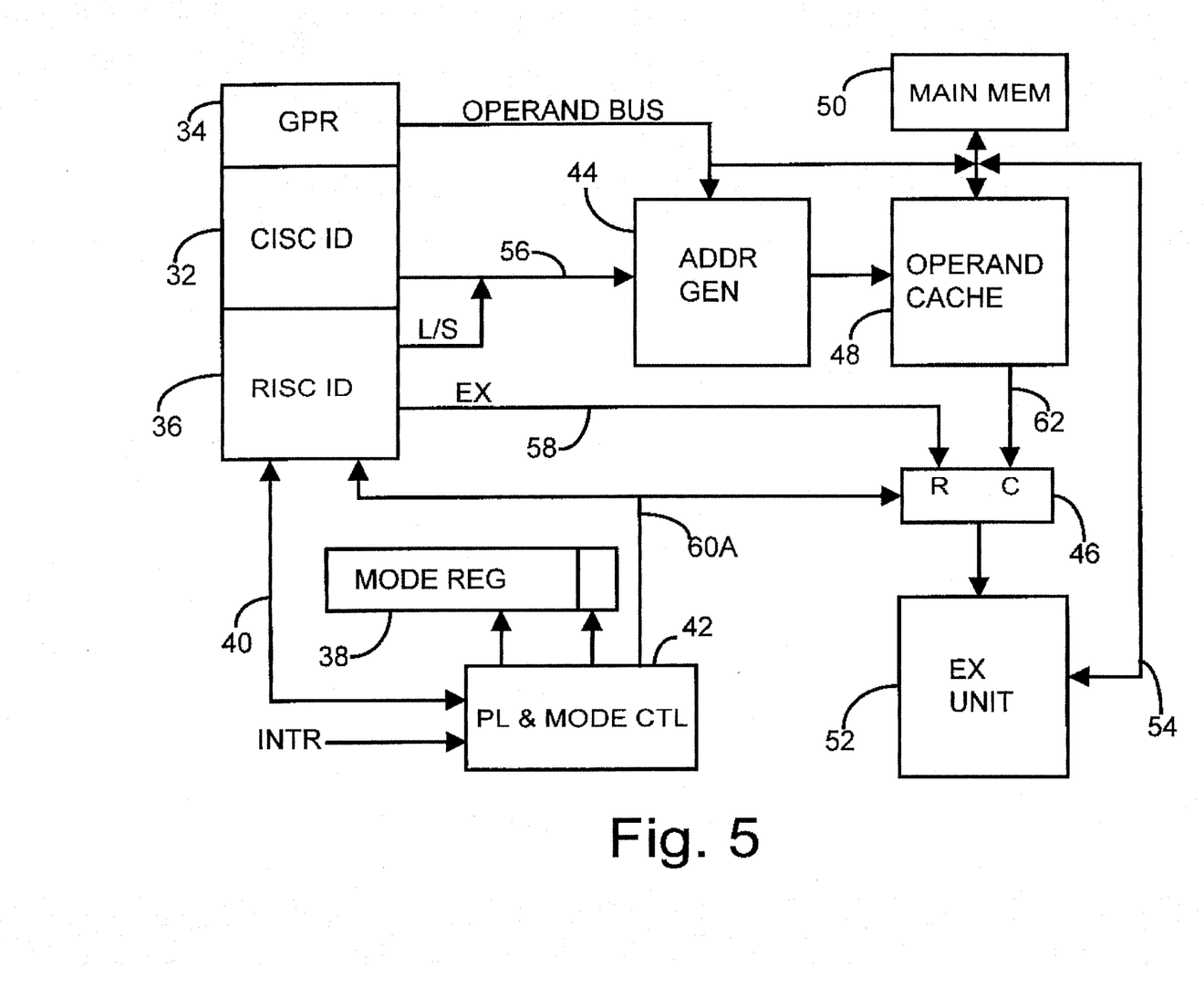
FIG. 5 is a block diagram of a dynamically and temporally-reconfigurable CPU.

However, dynamic configuration is also contemplated, as shown by FIG. 5. CISC instruction decode logic 32 will distinguish between compound or read-execute instructions that require the full CISC pipeline of D - A - C - E and simple instructions that do not require the full pipeline. For example, a simple execute CISC instruction would be detected by CISC decode unit 32 and would signal to mode control 42 over line 40 to re-configure the pipeline for a simple execute. Mode control 42 would then directly drive line 60A to directly connect the decode unit 32 to the execute unit 52 via mux 46. Line 60A would no longer indicate merely RISC/CISC mode, but would control the reconfiguration of the temporal location of the execute unit. Since line 60A would be driven directly by the mode logic 42, the pipeline could be reconfigured on a cycle-by-cycle basis for each instruction, although re-configuration may have to wait for busy functional units to finish. The mode & pipeline control logic 42 would have to be more complex, checking for other instructions in the pipeline before re-arranging the pipeline. The decode logic would also have to be able to detect simple vs. compound instructions, and be able to rapidly signal the pipeline logic 42. Timing would be critical.

FIXED PIPELINE WITH RE-LOCATABLE EXECUTE HARDWARE

In order to simplify pipeline control, only one instruction can complete at a time. The same minimum number of clocks are required for all instructions in the pipeline, even if the execute stage is moved early in the pipeline. Additional "dummy" stages are added as needed after the results are calculated to fill in the minimum number of clocks. The stage after the cache is re-named "M", for memory write-back, and all instructions flow through a 5-clock minimum flow:

```
D   A   C   M   W.
```

The execute hardware, including the ALU, can operate during the M stage, which would emulate the CISC pipeline. A compound CISC read-execute instruction would need the execute hardware in the M stage:

```
Rd-Ex   D   A   C   M/e   W
```

The execute hardware could also move up two clocks to the A stage, emulating the simple RISC-execute pipeline, D - E. However, stages C, M, and W will still occur to meet the minimum number of clocks for a flow:

```
D   A/e   C   M   W.
```

The execute hardware could also move ahead by one clock, to perform the execute operation during the C stage. Although the operand cache fetch would not be performed by a simple execute, the C stage is used as a "place holder" to add in a clock period. This case occurs for a simple execute following a load having a data interlock:

```
Load y   D   A   C     M   W
Add y        D   A   C/e   M   W
```

Note that the load instruction does not need the execute hardware; if it did, for example to set condition codes, it could occur during the A, C, or M stages. If it occurred during the M stage, then the Add instruction would have to delay the execute to its M stage because the execute hardware is busy during the Add's C stage:

```
Load y   D   A   C   M/e   W
Add y        D   A   C     M/e   W
```

Thus the execute hardware can be relocated within the fixed pipeline. All instructions follow the fixed pipeline of D - A - C - M - W. Functional units in these pipestages— decode, address generate, operand cache, memory write-back, and register write-back, never are relocated. They can only occur in this fixed order. However, the execute hardware is no longer a fixed pipestage. It can be re-located to occur, or perform an ALU or algebraic execute operation, during any of pipestages A, C, or M.

Although all instructions now require a minimum number of clocks, the results from the instructions are available earlier. Thus subsequent instructions do not have to stall for data interlocks, speeding up processing. In addition, since the execute hardware is no longer a fixed pipestage, execute operations could occur in any order, as long as the data is available (no data interlocks). Thus the execute for a subsequent instruction could precede the execute for a previous instruction:

```
Load y   D   A     C     M/e   W
Add z        D   A/e   C     M   W
```

Although this is possible, the preferred embodiment does not allow of out-of-order execute because of the added pipeline complexity.

Figure 6:
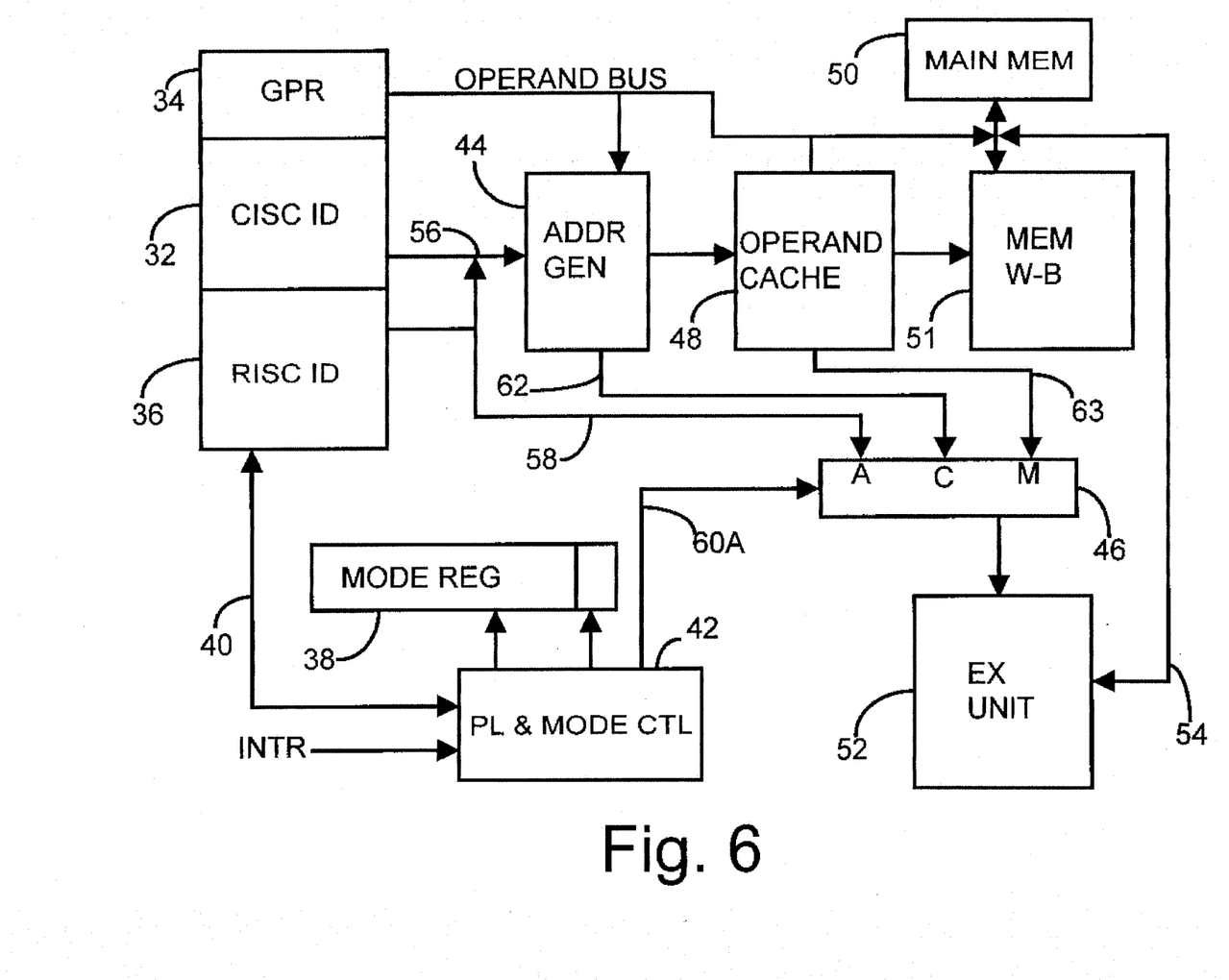
FIG. 6 is a block diagram of the preferred embodiment.

FIG. 6 shows a block diagram of the preferred embodiment. The figure is similar to FIGS. 4 and 5 and uses the same reference numbers when referring to similar elements. FIG. 6 has an additional memory write-back stage 51 that receives operands from operand cache 48. Execute hardware or unit 52 can be relocated within the pipeline by means of mux 46, which is controlled by signals 60A driven from mode and pipeline control logic 42. Mux 46 can receive inputs from 3 stages—decode 32 or 36, address generate 44, and operand cache 48. Since instructions are pipelined, mux 46 must receive operands and the decoded instruction and control information from the previous stage in the pipeline in order to have a full clock period to perform the operation. Thus when the execute is located in the address generate stage, mux 46 sends the decoded instruction and operands over bus 58 from the instruction decoder 32, 36. When execute occurs during the operand cache stage, bus 62 transmits the needed instruction information from the previous pipestage, the address generate stage 44. Finally, when execute occurs during the memory write-back pipestage, mux 46 receives operands over bus 63 from the operand cache pipestage. All RISC instructions are transmitted over bus 56 from the decode stage 36 to the address generate stage 44, even if the instruction is a simple execute. Thus all instructions travel through the full pipeline of decode 32 or 36, address generate 44, operand cache 48, memory write-back 51, and register write-back (not shown). Instructions may use the execute unit 52 during any of the 3 pipestages of address generate 44, operand cache 48, or memory write-back 51.

ALTERNATE EMBODIMENTS

The fixed pipeline with the execution hardware relocatable to the A, C, or M stages is the preferred embodiment because of the simplicity of having all instructions pass through the same pipestages. This embodiment retains the advantage of obtaining the results of a simple execute early in the pipeline, which eliminates or reduces data interlocks with subsequent instructions. Branch latencies are also improved since condition codes for simple execute instructions are determined earlier in the pipeline, usually when the execute operation is performed.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A CPU having a pipeline for processing a plurality of instructions from two separate instruction sets, said pipeline comprising:

first instruction decode means for decoding instructions from said first instruction set, said first decode means providing decoded instructions to said plurality of functional units, said first instruction set having a first encoding of opcodes to instructions;

second instruction decode means for decoding instructions from said second instruction set, said second instruction set having a second encoding of opcodes to instructions, said second encoding of opcodes to instructions being separate and independent from said first encoding of optodes to instructions, said second decode means providing decoded instructions to said plurality of functional units;

enable means for enabling either said first instruction decode means or said second instruction decode means, said enable means coupled to said first instruction decode means and coupled to said second instruction decode means;

a plurality of functional units for processing said plurality of instructions;

a relocatable functional unit in said plurality of functional units, said relocatable functional unit for executing native instructions from both of said two separate instruction sets;

means for indicating which one of said two separate instruction sets is being processed by said plurality of functional units; and means for relocating, responsive to said indicating means, said relocating means for temporally relocating said relocatable functional unit in time and sequence order to other functional units in said plurality of functional units.

2. The CPU of claim 1 wherein said two separate instruction sets comprise a first and a second instruction set, and wherein said relocatable functional unit is relocated by said relocating means when instructions from said first instruction set are being processed by said plurality of functional units.

3. The CPU of claim 2 wherein said relocatable functional unit is a functional unit for executing algebraic operations relocated by said relocating means when instructions from said first instruction set are being processed by said plurality of functional units.

4. The CPU of claim 2 wherein said first instruction decode means includes means for detecting a simple execute instruction and wherein a functional unit for executing algebraic operations is relocated by said relocating means when said simple execute instruction is detected by said first instruction decode means.

5. A CPU pipeline for executing a complex instruction set computer CISC instruction set and a reduced instruction set computer RISC instruction set, said pipeline comprising:

CISC decode means for decoding said CISC instruction set;

RISC decode means for decoding said RISC instruction set;

enable means for enabling either said RISC decode means or said CISC decode means, said enable means coupled to said RISC decode means and coupled to said CISC decode means:

a plurality of functional units, each functional unit in said plurality of functional units for executing both native RISC and native CISC instructions, said plurality of functional units receiving decoded insauctions from said CISC decode means and said RISC decode means, said plurality of functional units arranged in a sequence of functional units;

a relocatable functional unit in said plurality of functional units;

means for indicating if said RISC instruction set or said CISC instruction set is being processed by said plurality of functional units;

means for relocating, responsive to said means for indicating, said relocating means for relocating temporally said relocatable functional unit in time and sequence to other functional units in said plurality of functional units if said means for indicating indicates that said RISC instruction set is being processed.

6. The pipeline of claim 5 wherein said RISC instruction set has an encoding of opcodes to instructions separate and independent from the encoding of said CISC instruction set.

7. The pipeline of claim 6 wherein said relocatable functional unit is relocated relative to other functional units by said means for relocation when said enable means enables said RISC decode means.

8. The pipeline of claim 7 wherein said relocatable functional unit relocated by said means for relocation is a functional unit for execution of algebraic and logic instructions.

9. The pipeline of claim 8 wherein said functional unit for execution is relocated by said means for relocation to an earlier position in said sequence of functional units in said pipeline.

10. The pipeline of claim 9 wherein said functional unit for execution is relocated by said means for relocation to immediately after said RISC decode means, said functional unit for execution receiving decoded RISC execute instructions from said RISC decode means when said means for indicating indicates that said RISC instruction set is being processed.

11. A CPU pipeline for executing a complex instruction set computer CISC instruction set and a reduced instruction set computer RISC instruction set, said pipeline comprising:

CISC decode means for decoding said CISC instruction set;

RISC decode means for decoding said RISC instruction set;

enable means for enabling either said RISC decode means or said CISC decode means, said enable means coupled to said RISC decode means and coupled to said CISC decode means;

a plurality of functional units, said plurality of functional units receiving decoded instructions from said CISC decode means and said RISC decode means, said plurality of functional units arranged in a sequence of functional units;

a relocatable functional unit in said plurality of functional units, said relocatable functional unit in said plurality of functional units for executing both native RISC and native CISC instructions;

means for indicating if said RISC instruction set or said CISC instruction set is being processed by said plurality of functional units;

means for relocating, responsive to said means for indicating, said relocating means for relocating temporally said relocatable functional unit in time and sequence to other functional units in said plurality of functional units if said means for indicating indicates that said RISC instruction set is being processed.

12. The pipeline of claim 11 wherein said RISC instruction set has an encoding of opcodes to instructions separate and independent from the encoding of said CISC instruction set.

13. The pipeline of claim 11 wherein said relocatable functional unit is relocated relative to other functional units by said means for relocation when said enable means enables said RISC decode means.

14. The pipeline of claim 13 wherein said relocatable functional unit relocated by said means for relocation is a functional unit for execution of algebraic and logic instructions.

15. The pipeline of claim 14 wherein said functional unit for execution is relocated by said means for relocation to an earlier position in said sequence of functional units in said pipeline.

16. The pipeline of claim 15 wherein said functional unit for execution is relocated by said means for relocation to immediately after said RISC decode means, said functional unit for execution receiving decoded RISC execute instructions from said RISC decode means when said means for indicating indicates that said RISC instruction set is being processed.

* * * * *